Oct. 6, 1936.    S. JOHNSON, JR., ET AL    2,056,525
TRAILER VEHICLE
Filed March 14, 1933    3 Sheets—Sheet 1
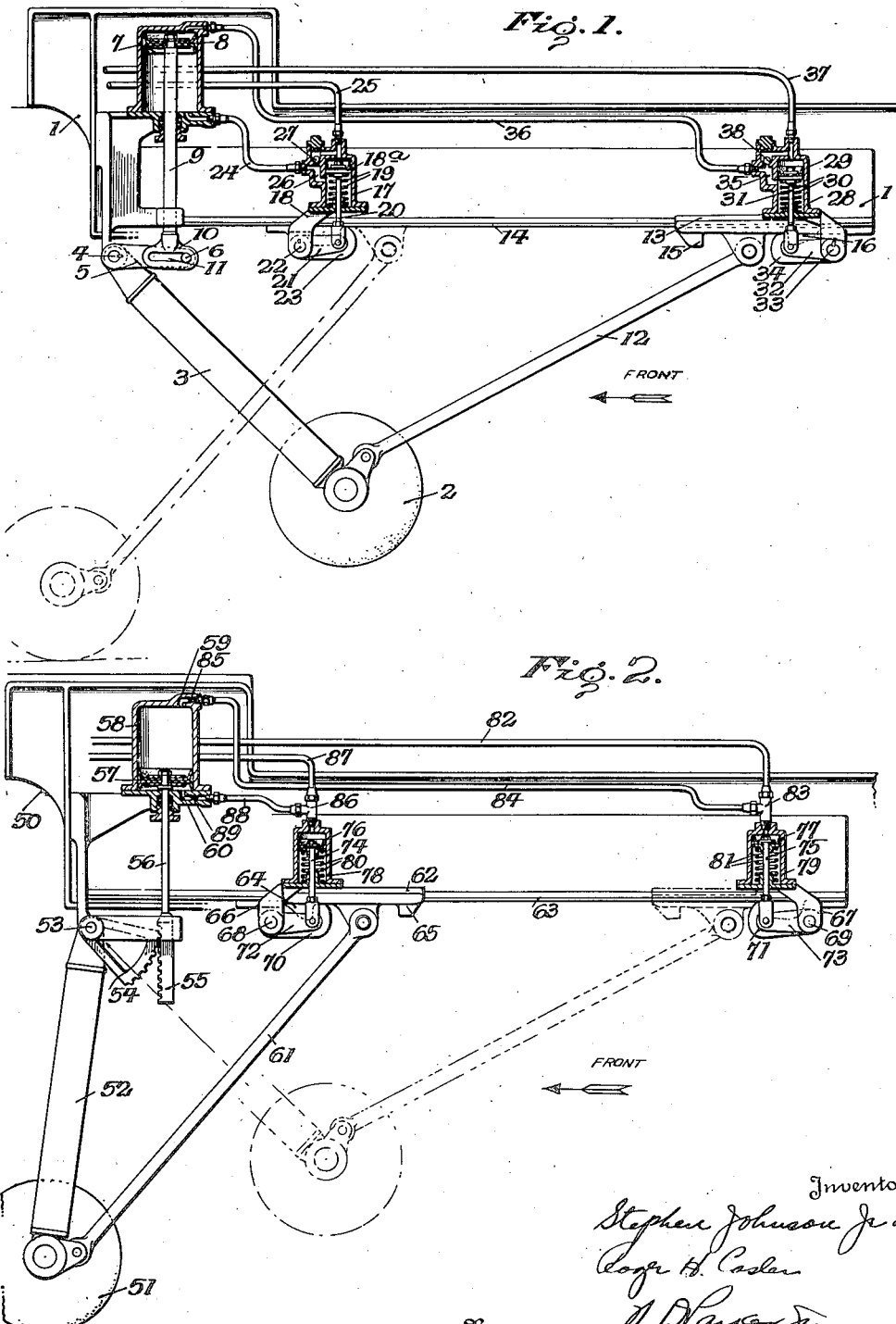

Oct. 6, 1936.  S. JOHNSON, JR., ET AL  2,056,525
TRAILER VEHICLE
Filed March 14, 1933  3 Sheets-Sheet 2
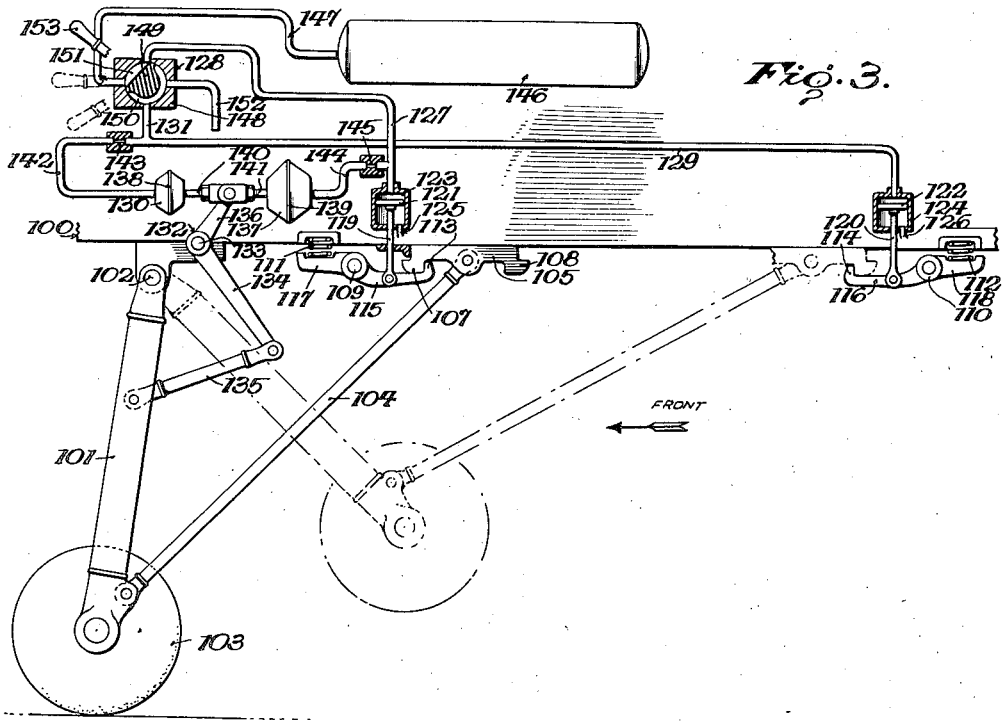
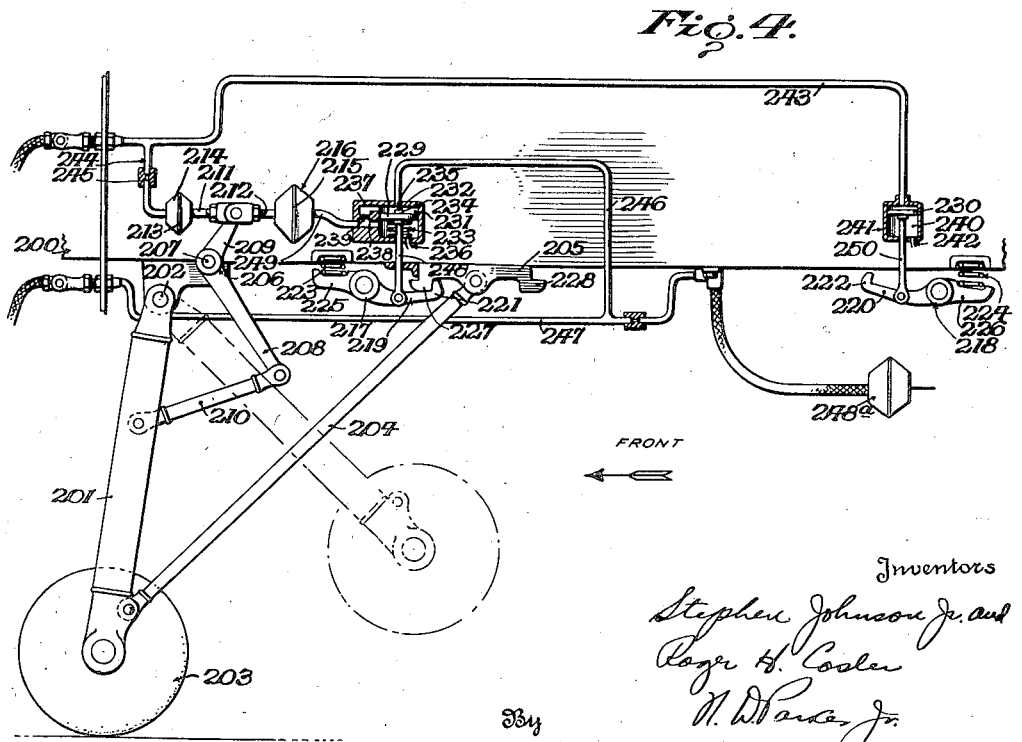

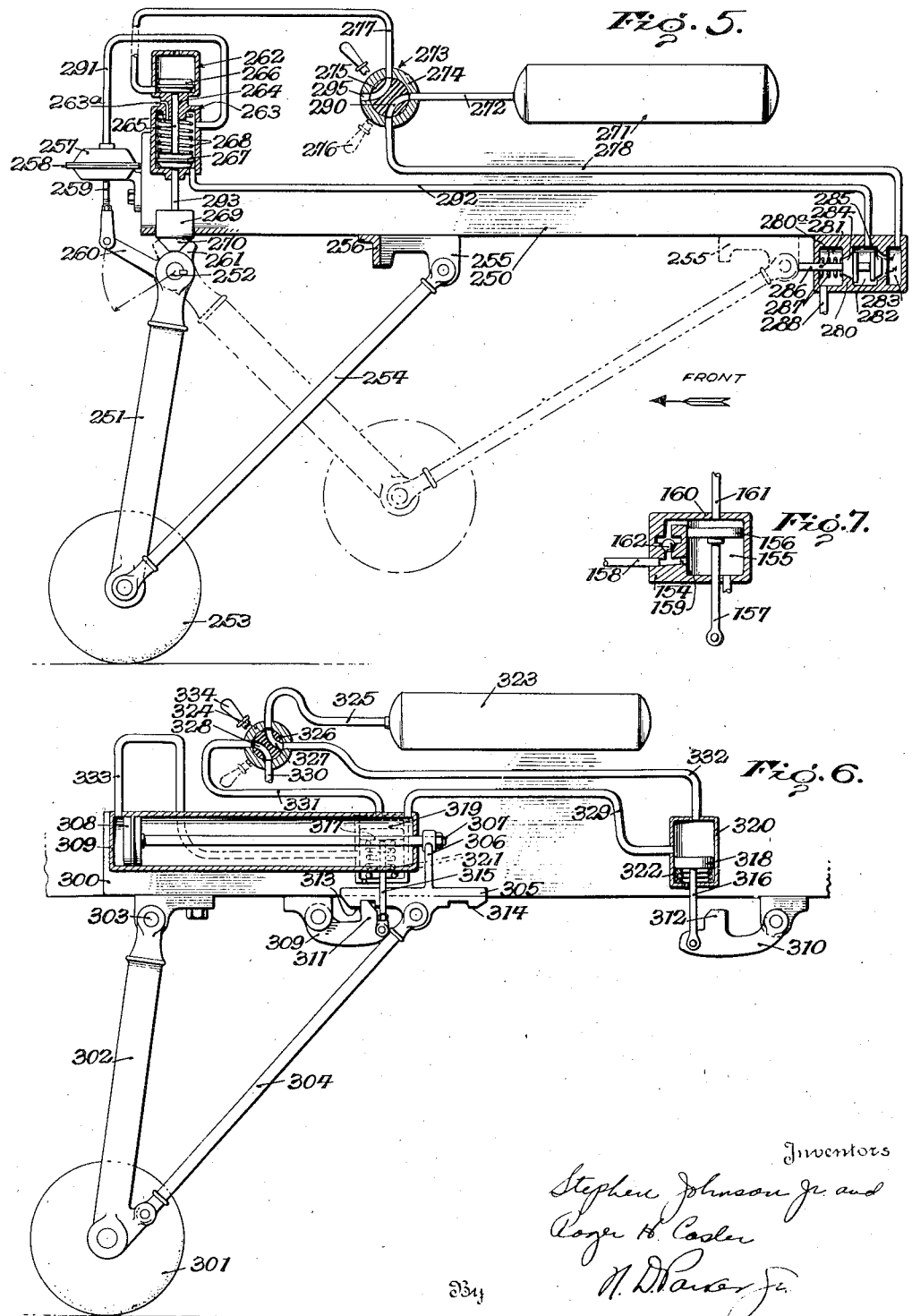

Patented Oct. 6, 1936

2,056,525

UNITED STATES PATENT OFFICE 2,056,525

TRAILER VEHICLE

Stephen Johnson, Jr., and Roger H. Casler, Pittsburgh, Pa., assignors to Bendix-Westinghouse Automotive Air Brake Company, Pittsburgh, Pa., a corporation of Delaware Application March 14, 1933, Serial No. 660,714

15 Claims. (Cl. 280—33.1)

The present invention relates to tractor and trailer vehicles and more particularly to means for raising and lowering the front or loading wheels of a trailer vehicle.

It is an object of the present invention to provide improved means for raising and lowering the loading wheels of a trailer vehicle.

Another object of the invention is to provide novel power-operated mechanism for raising and lowering the loading wheels of a trailer vehicle, which mechanism is so constituted as to positively hold said wheels in either raised or lowered position.

Another object is to provide novel power-operated mechanism for raising and lowering the loading wheels of a trailer vehicle, and including automatically-operable latch means for holding said wheels in either raised or lowered position.

Another object is to provide means for preventing the operation of the device for raising or lowering the trailer loading wheels until the latching mechanism has fully released the wheels.

Another object is to provide a novel single, fluid-pressure operated device for either raising or lowering the trailer loading wheels.

A further object is to provide in a device of the above character, means controlled by the position of the trailer loading wheels for controlling the operation of the latching mechanism.

A still further object is to provide in a trailer vehicle construction, means for raising or lowering the trailer loading wheels, so constituted as to be simple in design and construction but which will also provide a strong and reliable device.

Other objects and features of novelty will be apparent from the following description and drawings, wherein several modifications of the invention appear, it being understood that the invention is in no way limited by such description or drawings or other than by the appended claims.

Referring now to the drawings, in which similar reference numerals refer to like parts, Fig. 1 discloses one form which the invention may take;

Fig. 2 discloses a second form which the invention may take;

Fig. 3 discloses another system according to the present invention;

Fig. 4 discloses still another form which the invention may take;

Fig. 5 discloses a further system according to the present invention;

Fig. 6 discloses a still further form which the invention may take; and

Fig. 7 discloses a modified arrangement of the parts disclosed in Fig. 4.

Referring now particularly to Fig. 1, in which is illustrated one form of the present invention, the same embodies a body-frame member 1 of a trailer vehicle, the same being provided with a loading wheel 2, carried at the lower extremity of a supporting leg 3 which is pivotally mounted on the lower side of the trailer frame on a shaft 4, it being understood that a similar wheel and supporting leg assembly may be mounted on the other side of the trailer vehicle. Keyed to shaft 4 for rotation therewith or formed integrally with supporting leg 3, is a short arm 5 which extends at an angle to the said supporting leg and carries, at its outer extremity, a pin 6. The arm 5, shaft 4 and leg 3, it will be observed, will all rotate as a unit relatively to the frame member 1.

Mounted on the frame member 1 is a closed cylinder member 7, the axis of which extends vertically. Mounted for reciprocation within such cylinder is a piston member 8, having a piston rod 9 extending through the lower end of the cylinder and being provided, at its lower extremity with a member 10, the same having a slot therein adapted to receive the pin 6 carried by arm 5. Pivotally attached at its lower extremity to the axle housing of wheel 2 is a supporting rod 12, the upper end of which is pivotally connected to a member 13 which is slidably carried by a flange 14 of the frame member 1. Member 13 has depending from opposite ends of the lower side thereof, two downwardly-extending lug members 15, 16, the same being adapted for cooperation with latch mechanism to be described hereinafter. It will be apparent from the above that, as the piston 8 is reciprocated, the wheels 2 will be alternately raised and lowered, and the slidable member 13 will move back and forth along the frame member 1 between certain definite limits determined by the length of slot 11.

Means are provided for locking member 13 at the ends of its path of movement along frame member 1. Such means comprise a cylinder 17 mounted by bracket 18 on frame member 1 adjacent the forward limit of the travel of member 13, and having slidably mounted therein a piston 18ª, the same being constantly urged to its uppermost position by a spring 19 which may be disposed within cylinder 17. Piston rod 20 is connected to piston 18ª and extends through the lower end of the cylinder and is connected at its lower extremity to a lever member 21 which is keyed to a shaft 22 rotatably carried on the lower side of frame member 1. Also keyed to shaft 22 for rotation therewith is a latch member 23, the same comprising an arm having an upwardly-extending hook on the end thereof for cooperation with the lug member 15 carried by slidable member 13. When piston 18ª is in its normal uppermost position, the space below such piston is connected through passage 26 and pipe 24 to the portion of cylinder 7 below piston 8. The space above piston 18ª is constantly connected through a pipe 25 to suitable means through which fluid under pressure may be admitted to the space in cylinder 17 above piston 18ª. It should be noted that when the piston 18ª is forced downwardly by fluid under pressure introduced through pipe 24, the passage 26 connecting pipe 24 and the interior of cylinder 17 will be uncovered at about the mid-point of the downward travel of the piston, thereby connecting pipe 25 and pipe 24 through cylinder 17 and passage 26. Passage 26 is connected to the space above piston 18ª and to pipe 25 past a ball-check valve 27 which is so disposed as to allow fluid under pressure to flow from pipe 24 and chamber 26 to pipe 25 but prevents the flow of fluid in the opposite direction.

A second latch and latch-operating mechanism is disposed adjacent the other end of the path of travel of the slidable member 13, such second latch-operating mechanism being identical in construction to that described above. Such construction comprises, briefly, a cylinder 28 containing piston 29 which is constantly urged upwardly by spring 30, piston rod 31 connected to lever 32 carried by shaft 33, and latch device 34. The portion of cylinder 28 which is below the upper position of piston 29 is connected through passage 35 and pipe 36 to the upper end of cylinder 7. The upper end of cylinder 28 is connected through pipe 37 to suitable means whereby fluid under pressure may be introduced into said cylinder above piston 29. A ball-check valve 28 permits the flow of fluid under pressure from passage 35 to the space above piston 29 but prevents flow in the opposite direction.

In the operation of the above described structure, when the loading wheels are in the position shown in Fig. 1, i. e. raised out of engagement with the ground, the latch 34 is held in its raised position by spring 30 and engages the lug 16 on slidable member 13, the space above piston 29 being exhausted to atmosphere through pipe 37. If it is now desired to lower the loading wheels into engagement with the ground, fluid under pressure is introduced through pipe 37 to the space in cylinder 28 above the piston 29, thereby forcing the piston 29, piston rod 31, and lever 32 downwardly, rotating shaft 33 in a counter-clockwise direction and thereby moving the latch member 34 in a counterclockwise direction and out of engagement with the lug 16. In the initial stage of this operation fluid under pressure will not flow from pipe 37 to pipe 36 due to the interposition of ball-check valve 38 between the two pipes. However, as the piston 29 moves downwardly, the passage 35 will be uncovered and fluid under pressure will flow from pipe 37 to pipe 36 through cylinder 28 and through the uncovered passage 35, and such fluid under pressure will flow through pipe 36 to the upper end of cylinder 7, thereby forcing piston 8 downwardly, which, through pin 6, lever 5 and shaft 4, rotates the leg 3 and attached wheel 2 in a clockwise direction into engagement with the ground. As the wheel 2 moves downwardly, it will be apparent that the supporting rod 12 will move therewith, thereby causing member 13 to slide in a forward direction on the frame member 14, until at the limit of the downward movement of the wheel 2, the lug 15 on member 13 will abut the latch member 23. It will be apparent that, due to the configuration of the lug 15 and the latch member 23, the leftward movement of the lug member against the latch member will cause said latch member to move in a clockwise direction against the force of spring 19, and that when the lug 15 is engaged behind the hook on latch member 23, the spring 19 will hold the parts in latched position and the wheels in engagement with the ground. In the above operation, it will be understood that the pipe 25 communicates with the atmosphere.

With the wheels in ground-engaging position, if it is desired to raise the same, pipe 37 is connected to the atmosphere and fluid under pressure is introduced through pipe 25 to the space in cylinder 17 above the piston 18ª, thereby forcing such piston downwardly against the force of spring 19 and moving the latch member 23 out of engagement with lug 15. Due to the disposition of ball-check valve 27, no fluid under pressure will flow from pipe 25 to pipe 24 until the downward movement of piston 18ª has uncovered port 26, at which time fluid under pressure will flow from pipe 25 through cylinder 17, passage 26, and pipe 24 to the lower end of cylinder 7, thereby raising the piston 8, and, through the pin 6 and lever 5, rotate shaft 4 in a counter-clockwise direction, thereby raising the leg 3 and attached wheel 2. It will be apparent that as the wheel 2 is raised out of engagement with the ground, the supporting rod 12 will be moved to the right as viewed in Fig. 1 and, when the wheel 2 has arrived at a predetermined position, the lug 16 on member 13 will abut the latch member 34, and due to the configuration of such abutting members, the continued movement of the member 13 and lug 16 will cause the latch member to move in a counterclockwise direction against the force of spring 30. When the member 13 has moved sufficiently far, the tension of spring 30 will raise the latch member 34 into engaging position behind the lug 16, thereby holding the leg member 3 and wheel 2 in raised position.

Referring now to Fig. 2 in which is disclosed a modified form of the invention, the same includes in combination with the frame 50 of a trailer vehicle, a wheel 51 which is rotatably mounted at the lower extremity of leg member 52, the same being attached to a rotatable shaft 53 which is mounted in horizontal bearings on the lower side of the frame member 50. Also attached to shaft 52 for rotation therewith is a toothed quadrant member 54, the teeth on the arcuate face thereof engaging cooperating teeth on a rack bar 55 which is formed as a prolongation of a piston rod 56, the same being attached to and movable with a piston 57. Piston 57 is slidably received in a double-ended cylinder 58 which is provided at each end with a port, 59 and 60 respectively. Pivotally attached at its lower end to the axle housing of wheel 51 is a supporting rod 61, the same being pivotally attached at its upper end to the lower side of a member 62 which is mounted to slide longitudinally along the frame member 63, and which has formed on the lower face thereof the lugs 64, 65 for a purpose to be described hereinafter. At spaced points along the frame member 63 are mounted brackets 66, 67, each of which has depending portions in which are rotatably mounted the shafts 68, 69 respectively. Attached to said shafts for rotation therewith are the latch members 70, 71, the same having upwardly-extending hook portions for engagement with the lugs 63, 65. Also attached to the shaft for rotation therewith are the lever members 72, 73, the same being attached at their outer ends to the lower extremities of piston rods 74, 75. Said piston rods are attached at their upper ends to the pistons 76, 77, slidably received in cylinders 78, 79 and normally maintained in their uppermost positions therein by springs 80, 81. The cylinders may, if desired, be mounted on upwardly-extending portions of brackets 66, 67.

Means are provided for operating the above described parts, such means comprising a pipe 82, the same being adapted to be connected at one end, through valve means, to a source of fluid under pressure (not shown) and connected at its other end to the upper end of cylinder 79, through a T-joint 83. Connected to pipe 82 through one arm of the T-joint 83 is a pipe 84, the other end of which is connected to the upper end of cylinder 58 through port 59. Port 59 is provided with a restricted portion 85, the same restricting the flow of fluid under pressure into cylinder 58 from pipe 84 for a purpose to be described hereinafter. Connected to the upper end of cylinder 78 through a T-joint 86 is a pipe 87, the same being adapted to be connected at its other end, through valve means, to a source of fluid under pressure (not shown). A pipe 88 is connected at one end to pipe 87 through one arm of the T-joint 86 and at its other end to the lower end of cylinder 58 through port 60, such connection to the cylinder 58 including a restricted portion 89.

In the operation of the above described structure, if it is desired to raise the wheels out of engagement with the ground fluid under pressure is admitted to pipe 87 and through the same into cylinder 58 through pipe 88, restriction 89 and port 60, and into cylinder 78 above piston 76, thereby forcing the said piston downwardly against the force of spring 80, and rotating the lever 72, shaft 68 and latch member 70 in a clockwise direction, whereby the latch member 70 will release the lug 64. Due to the interposition of the restricted portion 89, the building up of pressure in cylinder 58 below piston 57 will be slower than the building up of pressure in cylinder 78 and the operation of piston 57 will therefore lag behind that of piston 76, whereby the complete release of the slidable member 62 by latch member 70 will be effected before movement of member 62 is initiated. When the pressure in cylinder 58 below piston 57 has built up to a sufficient point, piston 57, with the attached rack 55, will be raised, and due to the cooperation of the teeth on the rack member and those on the quadrant member 54, said quadrant, the shaft 53, and leg 52 will be rotated in a counterclockwise direction, thereby raising the wheel 51 out of engagement with the ground. When the wheel has reached a predetermined height above the ground, the lug 65 will abut the latch member 71, and, due to the configuration of these two abutting elements, the latch member will be moved in a counterclockwise direction, whereby continued movement of member 62 will cause lug 65 to be engaged behind the hook on latch member 71, the parts being held in engaged position by spring 81. It will be understood that during the above operation, pipe 82 is connected with the atmosphere.

If it is now desired to lower the wheels 51 into engagement with the ground, pipe 87 is connected with the atmosphere and fluid under pressure is introduced into pipe 82, and, through the same, into cylinder 79 above piston 77, thereby forcing said piston downwardly against the force of spring 81 and rotating lever 73, shaft 69 and latch member 71 associated therewith in a counterclockwise direction, whereby the said latch member will disengage the lug 65 to permit movement of slidable member 62 to the left. Fluid under pressure in pipe 82 also flows to cylinder 58 above piston 57 through T-joint 83, pipe 84, restricted passage 85 and passage 59. Due to the interposition of the restriction 85, however, the building up of pressure above piston 57 will lag behind the building up of pressure above piston 77 and the wheel lowering operation will not be initiated by piston 57 until the lug 64 has been completely freed by latch member 71. When the pressure above piston 57 reaches a sufficient point, the said piston, together with the attached rack 55 will be forced downwardly thereby, due to the cooperation of the teeth on the rack member and those on the quadrant 54, rotating the latter, shaft 53 and leg 52 in a clockwise direction and lowering the wheels 51 into engagement with the ground, and moving the slidable member 62 to the left as viewed in Fig. 2. As the member 62 reaches the end of its movement, the lug 64 will abut the latch member 70 and, due to the configuration of these two cooperating members, the latch device will be moved in a clockwise direction against the tension of spring 80. Further movement of member 62 will cause lug 64 to engage behind the hook on latch member 70, the parts being held in such position by spring 80, whereby the wheels 51 are maintained in their lowered position.

Another form which the invention may take is disclosed in Fig. 3, wherein it will be seen that the same has been illustrated as mounted on a trailer vehicle 100, and comprises a supporting leg 101, which is pivotally attached to the lower side of the trailer vehicle as at 102 and which is provided, at its lower extremity, with the wheel 103, it being understood that a similar construction at the other side of the vehicle is operated by the same mechanism which operates the leg and wheel structure disclosed. Pivotally connected at its lower end to the leg 101 adjacent the axis of the wheel 103, is a supporting rod 104, the same being pivotally connected at its upper end to a locking member 105 which is mounted on the longitudinal frame member 100 for sliding movement therealong, and which is provided at each end thereof with lugs or offset portions 107, 108. It will be apparent that as the wheels 103 are moved toward and from the ground, the member 105 will be moved longitudinally along the frame member.

Means are provided for locking the wheels in either raised or lowered position, such means comprising latching means for holding the slidable member 105 in position at either end of its longitudinal travel. Such last named means comprise double-ended lever members 109, 110, the same being pivotally mounted between their ends on the trailer vehicle adjacent the opposite limits of the travel of member 105 on the frame, and said lever members comprising the inner arms 115, 116 having hook or latch portions 113, 114, and comprising also the outwardly-extending arms 117, 118, against which bear the lower ends of springs 111, 112, for normally urging the lever members to the position shown. Connected respectively to the lever arms 115, 116, between the pivotal points of the lever members and the hook portions, are the lower ends of piston rods 119, 120, the same being attached at their upper ends to the pistons 121, 122, which are slidably mounted in cylinders 123, 124. Cylinders 123, 124 are provided with atmospheric openings 125, 126 below the pistons and, above the piston 121, cylinder 123 is connected by pipe 127 to a valve device 128, while above the piston 122, cylinder 124 is connected by pipes 129 and 131 to the valve device 128.

Means are provided for raising and lowering the wheels 103, such means comprising a bell-crank lever 132, the same being pivoted to the trailer frame adjacent the pivot 102, as at 133, and having a downwardly and rearwardly-extending arm 134, the lower end of which is connected, as by rod 135, to the supporting leg 101. The said lever is also provided with a rearwardly and upwardly-extending arm 136. A pair of oppositely-disposed diaphragm chambers 130, 137 are mounted on the trailer frame, the same being provided with the diaphragms 138, 139, to which are respectively connected the piston rods 140, 141. The said piston rods are aligned and at their outer ends, are attached to each other and to the upper end of the arm 136 of the bell-crank lever 132. The outer side of diaphragm chamber 130 is connected to the valve device 128 through pipe 142, restricted passage 143, pipe 129 and pipe 131. The outer side of diaphragm chamber 137 is connected to valve device 128 through pipe 144, restricted passage 145, and pipe 127.

Means are provided for actuating the above described structure, such means comprising a reservoir 146, in which fluid under pressure, such as compressed air, may be stored, said reservoir being connected by pipe 147 to the valve device 128. The valve device 128, as shown, comprises a valve casing 148 and a rotatable, cylindrical valve member 149, the same being provided with a passage 150 which extends peripherally over more than half the circumference of the valve member, and being also provided with a second passage 151 which is disposed on the opposite side of the circumference of the valve member from the passage 150. The valve member is so disposed in relation to the ports in the casing that passage 151 is constantly connected to the pipe 147 leading to the reservoir 146 while the valve member may be rotated to also connect the said passage to either pipe 127 or pipe 131. The passage 150 is constantly connected to atmosphere through a pipe 152, and the said rotation of the valve member is operative to connect said passage either to pipe 127 or pipe 131. A handle 153 may be provided for rotating the valve member 149. In the operation of the above described device, fluid under pressure from reservoir 146 is constantly supplied to passage 151 in valve member 149 through pipe 147, and in the position of parts as disclosed in Fig. 3, such fluid under pressure will flow from passage 151 through pipe 127 to cylinder 123 above piston 121, thereby forcing the latter and rod 119 downwardly to rotate lever 109 in a clockwise direction against the force of spring 111 and to disengage the hook portion 113 from the lug 107, whereby the slidable member is freed for movement along the trailer frame member. Fluid under pressure also flows from pipe 127 to diaphragm chamber 137 through restricted passage 145 and pipe 144, but, due to the provision of the said restricted passage, the building up of pressure will be slower in the said diaphragm chamber than in cylinder 123 and the action of the diaphragm 139 will therefore be retarded until the lug 107 has been disengaged as described above. When sufficient pressure has been built up in diaphragm chamber 137, the diaphragm 139 and attached piston rod 141 will be moved to the left as viewed in Fig. 3, thereby rotating bell-crank lever 132 in a counterclockwise direction about pivot 133, and through the arm 134 and rod 135, raising the leg 101 and wheels 103 until the latter are out of engagement with the ground. As the wheels 103 move upwardly and rearwardly the rod 104 will cause the member 105 to slide rearwardly on the trailer frame member until the lug 108 abuts the hook portion 114 of lever 110, when due to the configuration of the abutting parts, the said lever will be forced in a counterclockwise direction against the force of spring 112 thereby lowering the hook portion 114 and permitting further movement of member 110 until the lug 108 has moved sufficiently far to engage behind the hook member 114. The parts will then be maintained in this position by tension of spring 112. It will be noted that when the valve member 149 is in the proper position for effecting the raising of the wheels, the diaphragm chamber 130 is connected to atmosphere through pipe 142, restricted passage 143, pipes 129 and 131, passage 150 and atmospheric pipe 152.

If it is now desired to lower the wheels into engagement with the ground, the handle 153 may be moved to rotate the valve member 149 to such a position that pipe 131 is connected to pipe 147 and reservoir 146 through valve passage 151, such valve movement also connecting pipe 127, cylinder 123 and diaphragm chamber 137 to atmosphere through valve passage 150 and atmospheric pipe 152. Fluid under pressure from reservoir 146 will now flow to cylinder 124 through pipe 147, passage 151 and pipes 131 and 129 thereby forcing piston 122 and piston rod 20 downwardly and moving lever 110 in a counterclockwise direction, such movement moving hook portion 114 out of engagement with lug 108 whereby member 105 is freed for sliding movement along the trailer frame member. Fluid under pressure from reservoir 146 will also flow to diaphragm chamber 130 through pipe 147, valve passage 151, pipes 131, and 129, restricted passage 143 and pipe 142, but due to the interposition of the restricted passage 143 the building up of pressure will be slower in the said diaphragm chamber than in cylinder 124, whereby the movement of diaphragm 138 will not be initiated until the hook portion 114 has been moved out of engagement with lug 108. When sufficient pressure has been developed in diaphragm chamber 130, the diaphragm 138 and attached piston rod 140 will be moved to the right as viewed in Fig. 3 and the bell-crank 132 will therefore be rotated in a clockwise direction about pivot 133, and such movement will be transmitted through arm 134 and rod 135 to the supporting leg 101, thereby lowering the same and the attached wheels 103 into engagement with the ground. When the wheels 103 have reached a point near the end of their downward movement, the lug 107 will abut the hook portion 113 of lever 109 and, due to the configuration of the cooperating parts, the lever 109 will be moved in a clockwise direction about its pivot, thereby permitting further movement of member 105 until the lug 107 engages behind the hook portion 113, when the tension of spring 111 will force the said hook portion upwardly, thereby maintaining the parts in the wheel-lowered position.

While the system illustrated in Fig. 3 may be constructed and operated as described, Fig. 7 discloses a structure which may be substituted for the lever operating cylinder 123 or 124 and restricted passage arrangement disclosed in Fig. 3. In the structure disclosed in Fig. 7, a casing member 154 is provided, the same having a cylindrical chamber 155 formed therein in which is slidably mounted a piston 156, the same having a piston rod 157 extending downwardly from the lower side thereof, the lower end of which is adapted to be connected to either of the levers 109, 110 disclosed in Fig. 3. The cylinder 155 may be connected, above the piston 156, to the reservoir 146 through the pipe 161 and the valve device 128, and such cylinder and piston assembly corresponds to and may perform the functions of either of the lever-operating cylinder and piston assemblies disclosed in Fig. 3. A pipe 158 is connected to the cylinder 155 adjacent the bottom thereof through a passage 159 and the latter is connected to the cylinder above the piston through a passage 160 which includes a ball-check valve 162, the same permitting flow of fluid under pressure from pipe 158 and passage 159 to the upper portion of the cylinder but not in the opposite direction. The pipe 158 corresponds to either of the pipes 129 or 144 disclosed in Fig. 3 and connects the cylinder 155 to the diaphragm chamber.

In the operation of the structure disclosed in Fig. 7, fluid under pressure may be admitted into the upper portion of cylinder 155 through pipe 161 thereby forcing piston 156 and piston rod 157 downwardly and moving the attached lever member and hook portion thereon out of engagement with the cooperating lug on the slidable member 105. Due to the interposition of ball-check valve 162 fluid under pressure will not flow to pipe 158 and passage 159 through passage 160, but when the piston 156 reaches the limit of its downward movement the port 159 will be uncovered by piston 156 and fluid under pressure from reservoir 146 will flow to the diaphragm chamber through pipe 161, cylinder 155, passage 159 and pipe 158. It will thus be seen that the operation of the diaphragm chamber will not be initiated until after the hook portion of the lever member has released the lug on the slidable member 105 to permit sliding movement of said member.

Referring now to Fig. 4 in which there is disclosed a still further form which the invention may take, it will be seen that the same is disclosed in combination with the frame 200 of a trailer vehicle and the present embodiment of the invention comprises a supporting leg 201 which may be pivoted, as at 202, to the under side of the trailer frame and which carries, at its lower extremity, the wheel 203, it being understood that a similar construction is provided on the opposite side of the trailer vehicle and that both leg and wheel structures are adapted to be operated by the mechanism to be described hereinafter. Pivotally connected at its lower end to the supporting leg 201 adjacent the axis of the wheel 203, is a rod member 204, the upper end of which is pivotally connected to a member 205 which is adapted to slide longitudinally along the trailer frame, such motion being caused by the raising and lowering of the supporting leg and wheel structure. Slidable member 205 is provided, at opposite ends thereof with the downwardly-extending lugs 227, 228.

Means are provided for raising and lowering the wheels 203 and such means comprise a bell-crank lever 206, the same being pivotally mounted on the trailer frame as at 207 and being provided with a downwardly and rearwardly-extending arm 208 and an upwardly and rearwardly-extending arm 209. Arm 208 is connected at its lower end to one end of a rod 210, the other end of which is connected to the supporting leg 201. The upper end of arm 209 is connected to the joined ends of two oppositely-extending piston rods 211, 212, the piston rod 211 being connected at its other end to the diaphragm 213 of a diaphragm chamber 214, and the other end of piston rod 212 being connected to the diaphragm 215 of a diaphragm chamber 216.

Means are provided for maintaining the wheels in either their raised or lowered position, and such means comprise a pair of double-ended levers 217, 218, the same being pivoted adjacent their midpoints on the trailer frame and comprising arms 219, 220, each of which is formed with a hook or latch portion 221, 222, said arms being constantly urged to their uppermost positions by springs 223, 224 which bear at their one end against the trailer frame and at their other end against the arms 225, 226 of the said levers. Connected at their lower extremities to each of the levers 217, 218, at points intermediate the pivots thereof and the hook portions, are piston rods 249, 250, the same extending upwardly and being attached at their upper ends to pistons 229, 230. Piston 229 is slidably disposed in a cylindrical chamber 231 formed by a casing 232, and is normally maintained in its uppermost position by the tension of a spring 233, one end of which bears on the lower face of piston 229 and the other end of which bears on the casing 232. The upper face of piston 229 has formed thereon a concentrically-disposed pin valve 234 which is adapted when the piston is in its uppermost position, to seat on and close a port 235 in the upper end of chamber 231. The lower end of the said chamber is open to atmosphere through a port 236. The upper end of the casing 232 has formed therein a passage 237 which is in open communication with the chamber 231, and the lower portion of the casing 232 is provided with a passage 238 which is in open communication with the chamber 231 just below the uppermost position of the piston 229. Passages 237 and 238 are connected by a restricted opening 239.

Piston 230 is slidably disposed in a cylindrical chamber 240 formed in a casing 241, the bottom of said chamber being open to atmosphere through a port 242 and the upper part of said chamber having connected thereto one end of a pipe 243.

Means are provided for operating the above described structure, such means comprising the pipe 243 which, as stated hereinbefore, is connected at one end to chamber 240 and at its other end through suitable valve mechanism (not shown) to a source of fluid under pressure. Diaphragm chamber 214 is connected to pipe 243 through pipe 244 and restricted passage 245. Chamber 231 in casing 232 is connected through port 235 and a pipe 246, to the standard brake application pipe 247 of the trailer vehicle, it being understood that fluid under pressure is transmitted through pipes 247 and 246 only when the trailer braking device 248ᵃ is to be operated to apply the trailer brakes. Diaphragm chamber 216 is connected to chamber 231 below the piston 229 through port 238 and pipe 249.

In the operation of the above described structure, the wheels may normally be in the position disclosed, i. e., in contact with the ground. If it is now desired to raise the wheels out of engagement with the ground, the tractor brake valve is operated by the driver to cause a trailer brake application by operating brake device 248ª. In order to effect such operation, fluid under pressure will flow through pipe 247 to brake operator 248ª and said fluid under pressure will also flow through pipe 246 to chamber 231. Due to the fact that lug 227 is engaged with hook 221 on lever 217, the arm 219 of said lever and the connected piston 229 are not in their uppermost position but are depressed sufficiently to unseat the pin valve 234 from the port 235, thereby allowing fluid under pressure to flow from pipe 246 to chamber 231 fully depressing piston 229 and releasing hook member 221 from lug 227 to thereby permit sliding movement of member 205. Fluid under pressure from pipe 246 will also flow through passage 237, restricted passage 239, passage 238, and pipe 249 to diaphragm chamber 216 but due to the interposition of restricted passage 239 the build-up of pressure in diaphragm chamber 216 will be slow until the downward movement of piston 229 uncovers passage 238 at which time diaphragm chamber will be open to pipe 246 through chamber 231, passage 238 and pipe 249, thereby causing a subsequent rapid build-up of pressure in the diaphragm chamber. When such pressure has reached a sufficient value, the diaphragm 215 and attached piston rod 212 will be moved to the left and bell-crank lever 206 will be rotated in a counterclockwise direction about pivot 207, and the movement of arm 208 thereof will be transmitted through rod 210 to supporting leg 201, thereby raising the same together with the wheels 203. As the leg 201 and wheels 203 move upwardly and rearwardly, such movement will be transmitted through rod 204 to slidable member 205 which will move rearwardly along the trailer frame until the lug 228 abuts the hook portion 222 of lever 218. When this occurs, and due to the configuration of the two coacting parts, the lever 218 will be moved in a counterclockwise direction against the force of spring 224, thereby permitting further rearward movement of member 205 until lug 228 is engaged behind the hook portion 222. When such engagement takes place, the tension of spring 224 will maintain the parts in such position thereby holding the leg 201 and wheels 203 in raised position. At this time the braking pressure in pipe 247 may be released, the parts remaining in wheel-raised position in the manner described.

If it is now desired to lower the wheels into engagement with the ground, fluid under pressure from a suitable source may be introduced into pipe 243 from whence it will flow directly to chamber 240 in casing 241, thereby forcing piston 230, piston rod 228 and arm 220 of lever 218 downwardly, whereby the hook portion 222 will be moved out of engagement with lug 228 and slidable member 205 will be released for movement along the trailer frame. Fluid pressure from pipe 243 will also flow to diaphragm chamber 214 through pipe 244 and restricted passage 245 but, due to the interposition of the said restricted passage, the build-up of pressure in the diaphragm chamber will be retarded, and movement of diaphragm 213 and attached parts will not take place until after the described operation of piston 230 and lever 218 is ended. When sufficient pressure has been built up in chamber 214, the diaphragm 213 and attached piston rod 211 will be moved to the right as viewed in Fig. 4, thereby rotating bell-crank lever 206 in a clockwise direction about pivot 207. The resulting movement of arm 208 will be transmitted through rod 210 to the supporting leg 201, thereby moving the same in a clockwise direction about the pivot 202 and moving the wheels 203 into engagement with the ground. Such movement of the supporting leg 201 will be transmitted through rod 204 to slidable member 205 which will move along the trailer frame to the left as viewed in Fig. 4, until the lug 227 abuts the hook portion 221 of lever 217. When such abutment occurs, and due to the configuration of the coacting parts, the lever 217 will be moved in a clockwise direction about its pivot, thereby lowering the hook portion and permitting further movement of slidable member 205 until the lug 227 is engaged behind the hook portion 221. The wheels will now be in their lowered position and will be held in such position by the cooperation of hook portion 221 and lug 227, said hook portion being held in raised position by the tension of spring 223. The pressure in pipe 243 may now be reduced to atmospheric.

Still another form which the invention may take is disclosed in Fig. 5, wherein it will be seen that this modification is illustrated in combination with the frame 250 of a trailer vehicle, and comprises a supporting leg 251 pivoted to the lower side of the frame as at 252 and having mounted at the lower end thereof the trailer loading wheels 253. Formed integrally with the leg 251 and on the opposite side of the pivot 252 therefrom is disposed a locking member 261 for a purpose to be described hereinafter, and it will be noted that said locking member is disposed at a slight angle to the supporting leg. Pivotally connected at its lower end to the axle casing of the wheel 253 is a rod 254, the upper end of which is pivotally connected to the lower side of slidable member 255 which is adapted to have longitudinal sliding movement along the frame 250.

A stop 256 has been provided for limiting the movement of slidable member 255 in one direction, while adjacent the other limit of movement of member 255 along the frame member 250, a valve device 280 has been provided. Such valve device comprises a casing having three chambers 281, 282, 283 formed therein. Disposed within the chamber 282 is a valve member having two oppositely seating valve portions 284, 285 thereon, the valve 284 being adapted to seat in a bored passage between chambers 281 and 282 and the valve 285 being adapted to seat in a bored passage between chambers 282 and 283. Chamber 281 is constantly connected to atmosphere through a port 288. A stem 286 connects the said valve members and extends through the outer wall of chamber 281 for engagement by the slidable member 255. A spring 287 which bears against pin 280ª on stem 286 normally maintains the valve 284 seated and the valve 285 unseated for a purpose which will appear hereinafter.

Means are provided for raising the loading wheels 253 out of engagement with the ground, such means comprising a cylinder 257 mounted on the trailer frame and having a diaphragm 258 therein. Connected to the diaphragm and extending vertically downward therefrom is a piston rod 259, the same being connected at its lower extremity to the end of a lever 260 which is formed integrally with or suitably attached to the supporting leg 251 and joins the same adjacent the pivot 252 of said supporting leg. It will be apparent that depression of the diaphragm 258 and piston rod 259 will cause lever 260, supporting leg 251 and locking member 261 to move in a counterclockwise direction about the pivot 252.

Means are provided for locking the supporting leg and attached parts in either raised or lowered position, such means comprising a pair of aligned cylinders 262, 263, attached to the trailer frame above the pivot 252, the longitudinal axes of said cylinders passing through said pivot. The two cylinders are connected by a small passage 264 through which passes a connecting rod 265, the same having attached thereto the piston devices 266, 267 which are slidably disposed in the cylinders 262 and 263 respectively. A spring 268 bearing at one end against the upper end of cylinder 263 and at its other end against the piston 267, normally maintains both pistons at the bottoms of their respective cylinders. Depending from the lower side of piston 267 and extending through the lower end of cylinder 263 is a piston rod 293, the same carrying at its lower end a cylindrical member 269 the lower part of which is formed as an inverted pyramid or cone 270 and which lower part is adapted to cooperate with the locking member 261, and is so disposed with relation thereto, that when the said portion 270 is in its lower or operative position one of the faces thereof will abut the locking member and thereby prevent movement of the leg 251 and attached parts about the pivot 252.

Means are provided for operating the above described structure, such means comprising a fluid pressure reservoir 271, the same being connected by a pipe 272 to a valve device 273 which comprises a casing 274 having a rotatable valve 275 mounted therein, a handle 276 being provided for rotating the valve. Connected at one end through the valve casing 274 is a pipe 277, the other end of which is connected to the interior of cylinder 262 below piston 263. Also connected to the interior of valve casing 274 is a pipe 278, the same being connected at its other end to chamber 283 of valve casing 280. An arcuate port 290 is formed in the rotatable valve member 275 and such valve member may be rotated to connect either of pipes 277 or 278 to the reservoir 271 or to atmosphere through a port 295.

Communicating at one end with the interior of cylinder 263 and connected thereto just below the uppermost position of piston 267 is a pipe 291, the other end of which is connected to diaphragm chamber 257 on the side thereof opposite from the piston rod 259. Also communicating with cylinder 263, but at the bottom thereof, is a pipe 292, the other end of which is connected to the chamber 282 of valve casing 280. Cylinder 263 is preferably provided with a small atmospheric vent or choke 263ᵃ for a purpose which will appear more fully hereinafter.

In the operation of the above described structure, the loading wheels are normally lowered into engagement with the ground, as illustrated, the valve 275 being at this time in inoperative position and therefore not affording a connection through port 290 from the reservoir to either pipe 277 or pipe 278. In this position of the parts the spring 268 holds the cylindrical member 269 in lowermost position and the portion 270 thereof is in abutting relation with the left face of the locking member 261. It will thus be apparent that the leg 251 is not free to rotate about its pivotal connection, and that in order to so rotate the said leg it is necessary to move the abutting portion 270 out of engagement with the locking member 261. If it is now desired to raise the loading wheels 253 out of engagement with the ground, the handle 276 may be operated to rotate valve 275 to register the port 290 with pipes 272 and 278. Fluid under pressure will now flow from reservoir 271 to cylinder 263 below piston 267 through pipe 272, port 290, pipe 278, chamber 283 in valve casing 280, past normally open valve 285, chamber 282, and pipe 292, thereby raising the piston 267 against the force of spring 268, and raising the cylindrical member 269 and attached portion 270 out of engagement with the locking member 261. As the piston 267 approaches the upper limit of its movement, the connection of pipe 291 to cylinder 263 will be uncovered, thereby connecting the diaphragm chamber 257 to the source of fluid pressure through pipe 291 and the lower part of cylinder 263. Fluid pressure in diaphragm chamber 257 will cause diaphragm 258 and piston rod 259 to be moved downwardly, thereby rotating the lever arm 260, locking member 261 and supporting leg 251 in a counterclockwise direction and moving the loading wheels 253 out of engagement with the ground. The upward movement of wheels 253 will be transmitted through rod 254 to slidable member 255 which will then move rearwardly along the frame member 250. As the wheels approach the limit of their upward movement, the slidable member 255 will abut the valve rod 286 and will move the same, together with the attached valves 284, 285 to the right, thereby unseating valve 284 and seating valve 285. When valve 285 seats communication between chambers 282 and 283 is cut off and the flow of fluid under pressure from reservoir 271 to cylinder 263 is stopped and when valve 284 is unseated, as described, communication is established between chambers 281 and 282, thereby venting the lower part of cylinder 263 to atmosphere through pipe 292, chamber 282, past opened valve 284, chamber 281 and exhaust port 288. Due to the venting of the lower part of cylinder 263, the tension of spring 268 will force pistons 266 and 267 downwardly thereby forcing portion 270 into engagement with locking member 261 which is now in the wheel-raised position, as disclosed in broken lines in Fig. 5. It will be apparent that when cylinder 263 is vented to atmosphere as described above, and piston 267 moves downwardly under the influence of spring 268 a sufficient amount to uncover the port connecting the cylinder 263 with the pipe 291, the diaphragm chamber 257 will be vented to atmosphere through the small vent or choke 263ᵃ.

If it is now desired to lower the wheels 253 into engagement with the ground, the handle 276 is operated to rotate valve 275 to cause port 290 to connect the pipes 272 and 277, whereby fluid under pressure will flow from reservoir 271 to cylinder 262 through pipe 272, port 290, and pipe 277, thereby raising piston 266, piston 267 and cylindrical member 269 against the force of spring 268 and moving the abutting portion 270 out of locking engagement with locking member 261. With the locking members released, the wheels 253 are lowered into engagement with the ground, the weight of the same and attached parts causing them to be so lowered. As the wheels move downwardly, slidable member 255 will move forwardly on frame member 250, thereby releasing the valve stem 286 and allowing spring 287 to move valve 284 to its normal position shutting off communication between chambers 281 and 282, and also moving valve 285 to its normal position establishing communication between chambers 282 and 283. When the wheels 253 are in full contact with the ground, valve 275 may be rotated to connect the interior of cylinder 262 and pipe 277 to atmosphere through port 290 and atmospheric port 295, thereby allowing spring 268 to move the pistons 266, 267 and the locking member 269 to their lowermost position, thereby locking the wheels in lowered or ground-engaging position.

A still further form which the invention may take is disclosed in Fig. 6, in which figure the said invention is illustrated in combination with the frame 300 of a trailer vehicle, and comprises the trailer loading wheels 301, the same being mounted on the lower end of a supporting leg 302, it being understood that a similar construction is employed on each side of the trailer vehicle. The supporting leg 302 is pivotally connected at its upper end to the under side of the trailer vehicle as at 303. Pivotally connected at its lower end to the supporting leg 302 is a rod 304, the upper end of which is pivotally connected to the under side of a locking member 305 which is mounted on the trailer frame for sliding movement longitudinally thereof. Rigidly attached to, or integrally formed with, the upper side of the slidable member 305 is a projection 306, the upper portion of which is rigidly attached to the piston rod 307 of a piston device 308. The piston 308 is mounted for sliding movement in a cylinder 309 and it is to be noted that both ends of said cylinder are formed as pressure chambers, the piston rod 307 extending through suitable packing in one end wall of said cylinder in order to provide a leak-proof chamber.

Means are provided for locking the wheels in either raised or lowered position, such means comprising latch members 309, 310, the same being pivoted at one end to the trailer frame, and the other ends thereof being formed with upwardly-extending latch portions 311, 312 which are adapted to cooperate with the slots 313, 314 formed in the lower side of slidable member 305. Connected to the free ends of the latch members 309, 310 are the lower ends of upwardly-extending piston rods 315, 316, the upper ends of which are attached to the piston devices 317, 318 slidably disposed in cylinders 319, 320. Springs 321, 322 are disposed in the said cylinders below the piston devices therein and said springs constantly urge the pistons, piston rods and latch members to their uppermost position.

Means are provided for operating the above described structure and such means comprise a fluid pressure reservoir 323, the same being connected by a pipe 325 to a port in the casing 324 of a valve device. A second pipe 332 is connected at one end to a port in the valve casing and at its other end to the upper end of cylinder 320. A third pipe 331 is connected at one end to the upper end of cylinder 319 and at its other end to a port in the said valve casing. An atmospheric port 330 is also provided in the casing. Disposed within the casing 324 is a rotatable valve member 326, the same being provided with two ports 327, 328 and, as illustrated, such ports may, in one position, connect cylinder 320 to the reservoir 323 through pipe 332, port 327 and pipe 325, and at the same time connect cylinder 319 to atmosphere through pipe 331, port 328 and atmospheric port 330. It will be obvious that on proper rotation of the valve member 326, the ports 327, 328 will also be so disposed as to connect cylinder 320 to atmosphere and cylinder 319 to reservoir 323. Connected to cylinder 320 just above the lowest position of piston 317 is one end of a pipe 329 the other end of which is connected to the right-hand end of cylinder 309. The other end of cylinder 309 is connected by a pipe 333 to cylinder 319 just above the lowest position of piston 317. A handle 334 may be provided for operating the valve 326.

As illustrated in Fig. 6, the loading wheels are in engagement with the ground and spring 321 maintains latch member 311 in locking engagement with slidable member 305. If it is now desired to raise the loading wheels out of contact with the ground, the valve member 326 may be rotated to connect cylinder 319 to reservoir 323 through pipe 331, port 327 and pipe 325, at the same time connecting cylinder 320 to atmosphere through pipe 332, port 328 and port 330. Fluid under pressure in cylinder 319 will force piston 317, piston rod 315 and latch member 309 downwardly against the force of spring 321, thereby moving the latch end 311 out of engagement with the slot 313, and releasing member 305 for sliding movement. As piston 317 moves downwardly, the pipe 333 will be uncovered and fluid under pressure will flow therethrough to the left end of cylinder 309, thereby moving piston 308, piston rod 307 and member 305 to the right, whereby the rod 304 will exert such a pull on supporting leg 302 as to raise the wheels 301 out of engagement with the ground. As the wheels reach a predetermined height above the ground, the end of member 305 will abut the end of pivoted latch member 310 and, due to the configuration of the abutting parts, the latch member will be moved in a counterclockwise direction about its pivot, whereby the member 305 will be permitted a further movement to the right until the projection 312 on latch member 310 engages in the slot 314 in member 305, in which engaged position the parts will be held by spring 322.

If it is now desired to lower the wheels into engagement with the ground, the valve 326 may be operated to connect the cylinder 320 to the reservoir 323 through pipe 332, port 327 and pipe 325, such valve operation also connecting cylinder 319 to atmosphere through pipe 331, port 328 and port 330. Fluid pressure in cylinder 320 will force piston 318, piston rod 316 and latch member 310 downwardly, thereby moving the projection 312 on said latch member out of engagement with the slot 314, whereby the member 305 is released for sliding movement. As piston 318 moves downwardly, the pipe 329 will be uncovered and fluid under pressure will flow therethrough to the right-hand end of cylinder 309, thereby forcing piston 308, piston rod 307, projection 306 and slidable member 305 to the left as viewed in Fig. 6, and through rod 304, lowering the wheels 301 into engagement with the ground. As the wheels approach their lowermost position, the left end of slidable member 305 will abut the free end of pivoted latch member 309 and, due to the configuration of the two parts, the said latch member will be moved in a clockwise direction thereby permitting further movement of member 305 until the projection 311 engages in the slot 313, the parts being held in this position by the tension of spring 321.

While several modifications of the present invention have been illustrated and described, it will be apparent that further modifications, as well as changes in details of construction and operation, may be made without departing in any way from the spirit of the invention. Moreover, though the invention has been described in connection with loading wheels for trailer vehicles, it is to be understood that the same is not so limited in its application but may be employed for raising or retracting the wheels or supports of any vehicle, such as for example an aeroplane. Reference will therefore be had to the appended claims for a definition of the limits of the invention.

What is claimed is:

1. A vehicle comprising wheels mounted thereon, fluid-pressure operated means for raising or lowering said wheels, means including resilient means for maintaining said wheels in one position, and separate fluid-pressure operated means for releasing said last named means.

2. A vehicle comprising wheels mounted thereon, fluid-pressure operated means for raising said wheels, fluid-pressure operated means for lowering said wheels, resiliently operated means for maintaining said wheels in one position, and separate fluid-pressure operated means for releasing said last named means.

3. A vehicle comprising wheels pivotally mounted thereon, means for raising or lowering said wheels, means for maintaining said wheels in raised position, means for maintaining said wheels in lowered position, fluid-pressure operated means for releasing said second named means, fluid-pressure operated means for releasing said third named means, and means whereby fluid pressure is introduced into said raising or lowering means subsequent to the operation of either of said maintaining means.

4. A vehicle comprising wheels pivoted thereon, a single means for raising or lowering said wheels, means for maintaining said wheels in raised position, means for maintaining said wheels in lowered position, fluid-pressure means for releasing said second named means, fluid-pressure means for releasing said third named means, and means connecting said two fluid-pressure means to said single means through restricted passages.

5. A vehicle comprising wheels mounted thereon, a fluid-pressure operated means for raising said wheels, a second fluid-pressure operated means for lowering said wheels, means for maintaining said wheels in raised position, and means for maintaining said wheels in lowered position.

6. A vehicle comprising wheels mounted thereon, means for raising and lowering said wheels, latch means mounted on said vehicle for maintaining said wheels in one position, fluid-pressure operated means for operating said latch means in one direction, and separate means for operating said latch means in another direction.

7. A vehicle comprising wheels mounted thereon, means for moving said wheels relatively to said vehicle, means for maintaining said wheels in one position, and means operated by movement of said wheels for controlling the operation of said wheel-moving means and said maintaining means.

8. A vehicle comprising wheels mounted thereon, means for moving said wheels relatively to said vehicle, and means operated by movement of said wheels relatively to said vehicle for controlling the operation of said wheel-moving means.

9. A vehicle comprising wheels mounted thereon, means for moving said wheels, means for maintaining said wheels in one direction, and means operated by movement of said wheels for controlling the operation of said maintaining means.

10. A vehicle having loading wheels pivoted thereon, a fluid motor for raising and lowering said wheels, means for maintaining said wheels in raised position, and fluid pressure-operated means to release said maintaining means and to thereafter release fluid pressure to said motor.

11. In a trailer vehicle, a temporary leg support movable to supporting and non-supporting positions, latch means for locking the support in one of said positions, fluid pressure-operated means for releasing said latch means, and separate fluid pressure-operated means for positively moving said support from said positions.

12. In a trailer vehicle, a temporary leg support movable to supporting and non-supporting positions, latch means for locking the support in one of said positions, a fluid motor and means operated thereby for releasing said latch means, a separate fluid motor for positively moving said support from one of said positions, and means controlled by said first motor for energizing said separate motor.

13. A vehicle having a loading wheel, a fluid motor for raising and lowering said wheel, means for latching said wheel in raised position, and means for sequentially releasing said latching means and for thereafter energizing said motor.

14. A vehicle having a loading wheel, a fluid motor for raising and lowering said wheel, means for latching said wheel in raised position, and means including a fluid pressure-operated device for sequentially releasing said latching means and for thereafter energizing said motor.

15. In a trailer vehicle having a temporary leg support, power means for moving said support to non-supporting position, means for maintaining said support in said last named position, and means controlled by movement of said support to render said maintaining means operative.

STEPHEN JOHNSON, Jr.
ROGER H. CASLER.